(12) United States Patent
Hayashi et al.

(10) Patent No.: US 7,548,077 B2
(45) Date of Patent: Jun. 16, 2009

(54) MEASURING APPARATUS AND A MEASURING METHOD FOR MEASURING A POLARIZATION CHARACTERISTIC OF AN OPTICAL SYSTEM

(75) Inventors: Naoto Hayashi, Tochigi-ken (JP); Yoshiyuki Kuramoto, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/875,377

(22) Filed: Oct. 19, 2007

(65) Prior Publication Data

US 2008/0043226 A1 Feb. 21, 2008

Related U.S. Application Data

(62) Division of application No. 11/345,220, filed on Feb. 2, 2006, now Pat. No. 7,532,019.

(30) Foreign Application Priority Data

Feb. 3, 2005 (JP) .............................. 2005-027498

(51) Int. Cl.
*G01R 31/308* (2006.01)
*G01N 21/00* (2006.01)
(52) U.S. Cl. ........................................ 324/753; 356/73
(58) Field of Classification Search ...................... None
See application file for complete search history.

(56) References Cited

U.S. PATENT DOCUMENTS

| 6,538,722 | B2 | 3/2003 | Matsumoto et al. |
|---|---|---|---|
| 6,552,798 | B2 | 4/2003 | Ina et al. |
| 6,614,535 | B1 | 9/2003 | Kakuchi et al. |
| 6,633,362 | B2 | 10/2003 | Murakami et al. |
| 6,943,891 | B2 | 9/2005 | VanWiggeren |
| 2002/0057495 | A1 | 5/2002 | Kuramoto |
| 2003/0223073 | A1* | 12/2003 | VanWiggeren et al. ...... 356/477 |
| 2004/0114150 | A1 | 6/2004 | Wegmann et al. |
| 2004/0156051 | A1 | 8/2004 | Takeuchi et al. |
| 2004/0252311 | A1* | 12/2004 | Ishii et al. .................... 356/512 |
| 2005/0134863 | A1 | 6/2005 | De Lega et al. |

FOREIGN PATENT DOCUMENTS

| JP | 2000-277411 | 10/2000 |
|---|---|---|
| JP | 2000-277412 | 10/2000 |
| JP | 2002-022608 | 1/2002 |
| JP | 2004-061515 | 2/2004 |

\* cited by examiner

*Primary Examiner*—Ha Tran T Nguyen
*Assistant Examiner*—Roberto Velez
(74) *Attorney, Agent, or Firm*—Fitzpatrick, Cella, Harper & Scinto

(57) ABSTRACT

A measuring apparatus is disclosed which includes an interferometer for measuring a wavefront of light transmitted through a test object by interference between light under test passed through the test object and reference light, and measures a polarization characteristic of the test object. The measuring apparatus has a measuring unit for measuring a polarization characteristic matrix in a pupil plane of the test object while the reference light is blocked or fringe scan is performed.

6 Claims, 7 Drawing Sheets

MEASURING APPARATUS AND A MEASURING METHOD FOR MEASURING A POLARIZATION CHARACTERISTIC OF AN OPTICAL SYSTEM

BACKGROUND OF THE INVENTION

The present invention generally relates to a measuring apparatus and a measuring method, and more particularly, to a measuring apparatus and a measuring method for measuring a polarization characteristic (birefringence) of an optical system (specifically, a projection optical system) of an exposure apparatus used during a lithography process in manufacturing various devices such as a semiconductor device and a liquid crystal display device.

In manufacturing very small devices with a photolithography technique, a reduced projection exposure apparatus has been used in which a projection optical system projects a circuit pattern onto a photosensitive substrate such as a wafer to transfer the circuit pattern to the photosensitive substrate.

The reduced projection exposure apparatus needs to transfer a reticle pattern accurately to a wafer at a predetermined scaling factor. To satisfy the need, it is important to use a projection optical system (a projection lens) excellent in optical performance such as an imaging property. In recent years, particularly, miniaturization of devices accomplished at a fast pace has often required pattern transfer beyond a normal imaging property, and the pattern transfer is becoming sensitive to birefringence which is a polarization characteristic of an optical system.

Several apparatuses and methods have conventionally been proposed for measuring birefringence. For example, a proposed apparatus measures birefringence by using light transmitted through a test object similarly to a stress measuring apparatus for a semiconductor wafer. Such an apparatus, however, can only measure birefringence at a certain point on a surface of the test object (in other words, it only can perform point measurement) since the apparatus has no image-forming system. When birefringence needs to be measured over a wide area, scanning should be performed for the test object (or for a light source). Thus, the apparatus is complicated and is not suitable for a test object which needs measurement over a wide area such as a projection optical system. To address this, another proposed apparatus enables measurement of birefringence of a test object over a wide area thereof by using a shearing interferometer having an image-forming system. For example, Japanese Patent Laid-Open NO. 2004-61515 has proposed such an apparatus.

The apparatus using the shearing interferometer proposed in Japanese Patent Laid-Open No. 2004-61515 measures birefringence with a diffraction grating removed, while the diffraction grating is inserted thereinto when a wavefront is measured. As a result, the apparatus is directly affected by birefringence in the diffraction grating, thereby making it impossible to measure the birefringence accurately.

In addition, diffracted light emerges in a direction at an angle with respect to the incident light, so that the direction of polarization can be changed. It is thus difficult to eliminate the influence of the optical system (that is, the image-forming system included in the shearing interferometer) other than the test object (such as a projection optical system) in measuring a wavefront, and it is impossible to provide complete consistency between the wavefront measurement and the birefringence measurement. In other words, the influence of the optical system included in the apparatus upon the polarization characteristic cannot be measured precisely, and the birefringence of the test object cannot be measured accurately.

BRIEF SUMMARY OF THE INVENTION

It is an object of the present invention to provide a measuring apparatus and a measuring method which allow accurate measurement of birefringence of a test object over a wide area thereof.

A measuring apparatus according to one aspect of the present invention for measuring a polarization characteristic of a test object includes an interferometer for measuring a wavefront of light transmitted through the test object by interference between light under test passed through the test object and reference light, and a measuring unit for measuring a polarization characteristic matrix in a pupil plane of the test object by using fringe scan.

A measuring apparatus according to another aspect of the present invention includes an interferometer which measures a wavefront of light transmitted through a test object by interference between light under test passed through the test object and reference light, and measuring a polarization characteristic of the test object, and a measuring unit for measuring a polarization characteristic matrix in a pupil plane of the test object while the optical path of the reference light is blocked.

A measuring apparatus according to yet another aspect of the present invention includes an interferometer which measures a wavefront of light transmitted through a test object by interference between light under test passed through the test object and reference light, and measuring a polarization characteristic of the test object, and a measuring unit for measuring a polarization characteristic matrix in a pupil plane of the test object while the reference light is blocked by moving a spatial filter.

A method according to another aspect of the present invention of measuring a polarization characteristic of a test object by using an interferometer which measures a wavefront of light transmitted through the test object by interference between light under test passed through the test object and reference light includes the steps of measuring a polarization characteristic matrix in a pupil plane of the test object by using fringe scan, and calculating the polarization characteristic of the test object from the polarization characteristic matrix measured in the measuring step.

A method according to yet another aspect of the present invention of measuring a polarization characteristic of a test object by using an interferometer which measures a wavefront of light transmitted through the test object by interference between light under test passed through the test object and reference light includes the steps of blocking the optical path of the reference light, and calculating a polarization characteristic matrix in a pupil plane of the test object.

A method according to a further aspect of the present invention of measuring a polarization characteristic of a test object by using an interferometer which measures a wavefront of light transmitted through the test object by interference between light under test passed through the test object and reference light includes the steps of blocking the reference light by moving a spatial filter, and calculating a polarization characteristic matrix in a pupil plane of the test object.

A measuring method according to another aspect of the present invention includes the steps of measuring a transmitted wavefront in the pupil plane of the test object with the abovementioned measuring apparatus, normalizing a phase term of polarization characteristic matrix distribution in the pupil plane of the test object based on the transmitted wavefront measured in the measuring step, and calculating a transmitted wavefront in the pupil plane of the test object for an arbitrary polarization state from the phase term of the polarization characteristic matrix distribution normalized in the normalizing step.

A measuring method according to yet another aspect of the present invention includes the step of determining distribution of a light amount transmitted through the test object and an optical system of the interferometer, distribution of a light amount transmitted through the optical system of the interferometer excluding the test object, a polarization characteristic matrix of the test object, and a polarization characteristic matrix of the optical system of the interferometer excluding the test object by using the abovementioned measuring apparatus, and calculating distribution of transmittance in the pupil plane of the test object for an arbitrary polarization state based on the determined information.

Other objects and features of the present invention will become readily apparent from the following description of the preferred embodiments with reference to accompanying drawings.

According to the present invention, a measuring method and a measuring method can be provided which enables accurate measurement of birefringence of a test object over a wide area thereof.

DETAILED DESCRIPTION OF THE PREFERRED EMBODIMENTS

Preferred embodiments of the present invention will hereinafter be described with reference to the accompanying drawings.

Embodiment 1

Figure 1A:
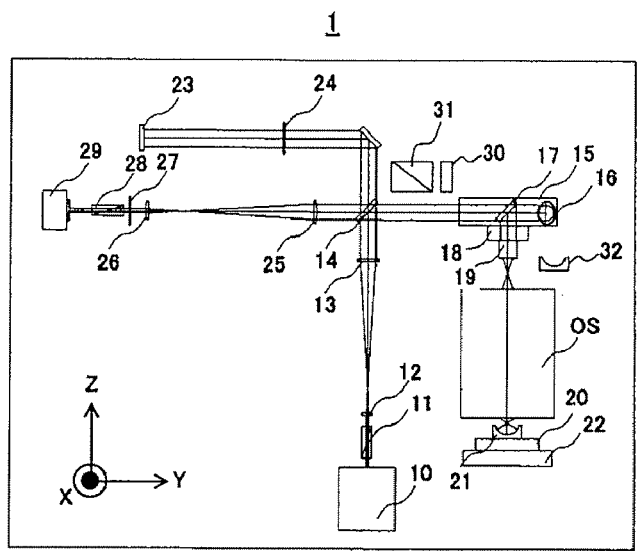
FIG. 1A is a schematic section view showing the basic structure of a measuring apparatus according to an aspect of the present invention.

FIG. 1A is a schematic section view showing the basic structure of a measuring apparatus 1 according to an aspect of the present invention. The measuring apparatus 1 of Embodiment 1 includes a Twyman-Green interferometer for measuring a wavefront of light transmitted through a test object OS (a transmitted wavefront) and measures birefringence (a polarization characteristic) of the test object OS. In Embodiment 1, a projection optical system (a projection lens) of a projection exposure apparatus is assumed as the test object OS.

Referring to FIG. 1A, luminous flux which emitted from a light source 10 is transmitted through a polarizer 11 to have a predetermined (that is, a known) polarization state. The luminous flux emitting from the light source 10 is circularly polarized. Simply rotating the polarizer 11 about the optical axis of a measuring optical system of the measuring apparatus 1 can provide a sufficient amount of arbitrarily linearly polarized light. The measuring optical system refers to an optical system having at least one optical element which directs the luminous flux from the light source 10 to the test object OS and directs the light passing through the test object OS to a detector. For example, in Embodiment 1, the measuring optical system consists of optical elements 12, 13, 14, 21, 25, 26 and the like. The polarizer 11 is disposed to be driven on a θ stage, not shown, and controlled by a controller, not shown. The polarizer 11 usable at the same wavelength as that of the projection optical system (the test object OS) which is used with light at the wavelengths of ultraviolet rays or lower includes a Rochon prism including magnesium fluoride ($MgF_2$) as a material.

The luminous flux which passed through the polarizer 11 is linearly polarized depending on the rotation angle of the polarizer 11. The luminous flux which passed through the polarizer 11 passes through beam expanders 12 and 13 for increasing the beam diameter and is then incident on a half mirror 14 as collimated luminous flux. The luminous flux reflected by the half mirror 14 and the luminous flux transmitted through the half mirror 14 will hereinafter be referred to as luminous flux under test and reference luminous flux, respectively.

Figure 1B:
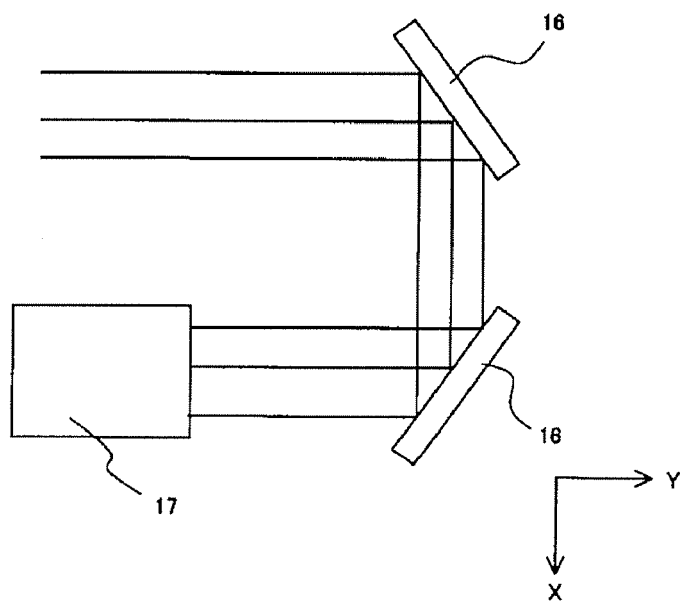
FIG. 1B shows the structure of the measuring apparatus in FIG. 1 around a stage.

The luminous flux under test enters an object-side XY stage 15, and as shown in FIG. 1B, is reflected by an X stage return mirror 16 to a mirror 17 on a Y stage, not shown, and is then reflected by the mirror 17 to an object-side Z stage 18. The return by the mirror is performed for the purpose of providing the same optical axis with respect to the stage even when the stage is moved, so that the luminous flux may be incident on the mirrors in a different order from that in Embodiment 1. A collimator lens 19 is disposed on the object-side Z stage 18. The object-side Z stage 18 is driven in the optical axis direction such that the focal point of the collimator lens 19 is at the object surface of the test object OS. The object-side XY stage 15 is driven in the direction perpendicular to the optical axis such that the focal point of the collimator lens 19 is at the object position where birefringence is measured.

The luminous flux under test which passed through the collimator lens 19 and entered the test object OS passes through the test object OS and is formed into an image at an image point which is determined by the magnification of the test object OS. A spherical mirror 21 is disposed on an image-side Z stage 20. The image-side Z stage 20 and an image-side XY stage 22 adjust the position such that the center of curvature of the spherical mirror 21 coincides with the image-forming position (the image point) of the test object OS. As the spherical mirror 21, a mirror made of raw glass or silicon (Si) crystal is used in order to avoid the influence of birefringence. The luminous flux under test which was reflected by the spherical mirror 21 passes through the test object OS and is returned to the half mirror 14 along the same optical path.

On the other hand, the reference luminous flux which passed through the half mirror 14 is routed to travel along the optical path with the same length as that of the luminous flux under test before reflection by a reference mirror 23. The reference luminous flux which was reflected by the reference mirror 23 is returned to the half mirror 14 along the same optical path and is caused to interfere with the luminous flux under test. However, the reference luminous flux is blocked by a light shield plate 24 when the birefringence of the test object OS is measured. The light shield plate 24 can be inserted into and removed from the optical path of the measuring optical system. The light shield plate 24 is disposed in the optical path of the measuring optical system as shown in FIG. 1A when the birefringence is measured, while it is removed from the optical path when the transmitted wavefront is measured.

The luminous flux under test which passed through the half mirror 14 is transmitted through pupil image-forming lenses 25 and 26 for providing a conjugate relationship between the pupil of the test object OS and a camera 29, and becomes collimated again. The collimated luminous flux under test is subjected to polarization modulation by a λ/4 plate 27 disposed on a θ stage, not shown. Only the linearly polarized component specified by the angle of an analyzer 28 is transmitted through the analyzer 28 and is taken as an image by the camera 29 serving as a detector. The θ stage, not shown, is controlled by a controller, not shown. The angle of the fast axis of the λ/4 plate 27 at the origin point of the θ stage and the angle of the transmission axis of the analyzer 28 are adjusted in parallel with the sheet (FIG. 1A), similarly to the transmission axis of the analyzer 28.

Embodiment 1 employs the λ/4 plate 27 as a wavelength plate for providing a predetermined phase lag for the luminous flux under test, a wavelength plate other than the λ/4 plate may be used as long as it provides an obvious phase lag other than λ/2. A Rochon prism is used as the analyzer 28 similarly to the polarizer 11.

Next, description will be made of a method of measuring a polarization characteristic matrix of the test object OS by the measuring apparatus 1. In Embodiment 1, the polarization characteristic matrix is the Jones matrix which represents the polarization change characteristic of a polarization element in a two-by-two (two rows and two columns) matrix. The birefringence can be derived from the Jones matrix.

First, the θ stage is driven such that the polarizer 11 is placed at an angle of θpol1. As a result, the luminous flux emerging from the polarizer 11 is linearly polarized at the angle of θpol1. Such a polarization state is expressed as Xin1, where X represents a complex number given from the elements of two columns when the Jones matrix is normalized for the elements of one column, and Xin will hereinafter referred to as a polarization parameter.

Next, the camera 29 takes images showing the changing light amount while the λ/4 plate 27 is rotated. The rotation of the λ/4 plate 27 needs to be synchronized with the taking of images of the transmitted light amounts by the camera 29. It is possible to take images simultaneously with the rotation of the λ/4 plate 27 or to perform so-called step-and-repeat in which the rotation of the λ/4 plate 27 in steps of small angles and the image taking by the camera 29 are alternated.

A polarization parameter Xout1 at the incidence on the λ/4 plate 27 is calculated from a change in the transmitted light amount for each pixel of the camera 29 with the rotation of the λ/4 plate 27. The following expression 1 can be given by extracting the DC component, the second harmonic component, the fourth harmonic component in the transmitted light amount change with a method such as Fourier analysis:

$$X_{out} = \frac{2FHs - iSHs}{DC + FHc} \quad \text{(Expression 1)}$$

where DC represents the DC component, SHs the sine component of the second harmonic, FHs the sine component of the fourth harmonic, and FHc the cosine component of the fourth harmonic.

When the λ/4 plate 27 involves a phase lag error due to manufacturing errors or the like, the phase lag may be previously measured to make correction in calculating the polarization with the phase shifter. The polarization calculation with the phase shifter is performed for all the angles of view in the pupil of the test object OS to be taken.

Such measurement is performed for the independent three incident linear polarization states Xin1, Xin2, and Xin3 to calculate the polarization parameters Xout1, Xout2, and Xout3.

Next, the Jones matrix J is calculated as a polarization characteristic matrix of all the optical elements (the optical system) which transmit or reflect the luminous flux from the polarizer 11 to the λ/4 plate 27. The Jones matrix J of the optical elements normalized for elements in two rows and two columns is calculated as the following expression 2:

$$J = \begin{bmatrix} X_{in2} - X_{in1}H & H - 1 \\ X_{in2}X_{out1} - X_{in1}X_{out2}H & -X_{out1} - X_{out2}H \end{bmatrix} \quad \text{(Expression 2)}$$

$$H = \frac{(X_{out3} - X_{out1})(X_{in3} - X_{in2})}{(X_{out3} - X_{out2})(X_{in3} - X_{in1})}$$

where Xin1, Xin2, and Xin3 represent the incident linear polarization states, and Xout1, Xout2, an Xout3 represent the polarization parameters.

The Jones matrix J of the optical elements is also calculated for all the angles of view in the pupil of the test object OS similarly to the emergence polarization parameters described above. The Jones matrix provided from the structure shown in FIG. 1A is referred to as Jtest.

Figure 2:
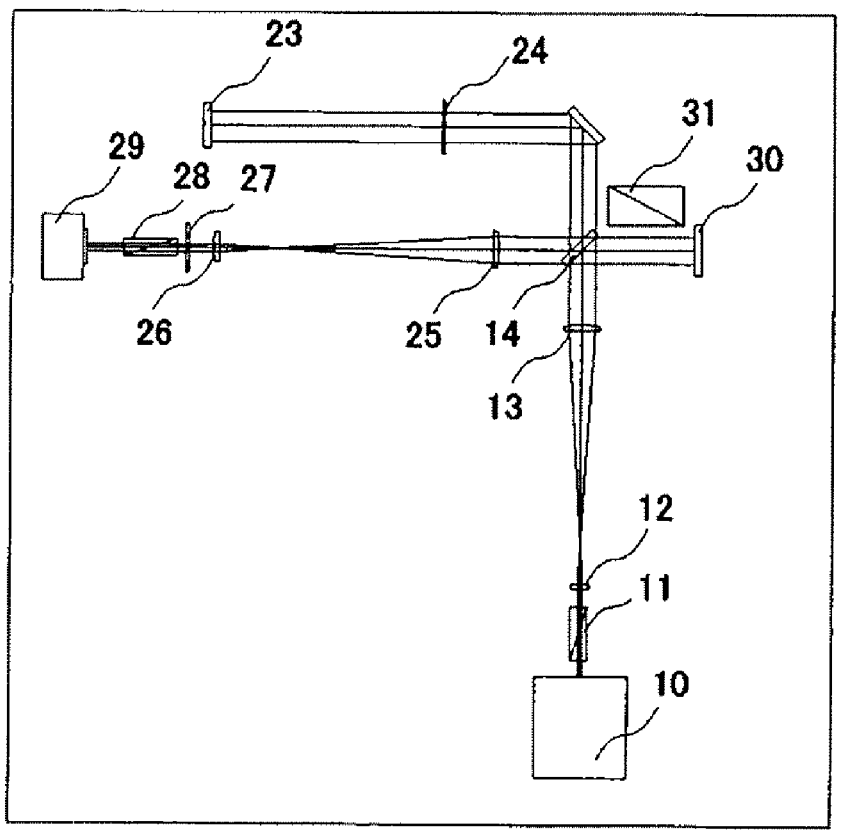
FIG. 2 is a schematic section view showing the structure of the measuring apparatus for measuring a polarization optical characteristic of a measuring optical system other than a test object.
Figure 3:
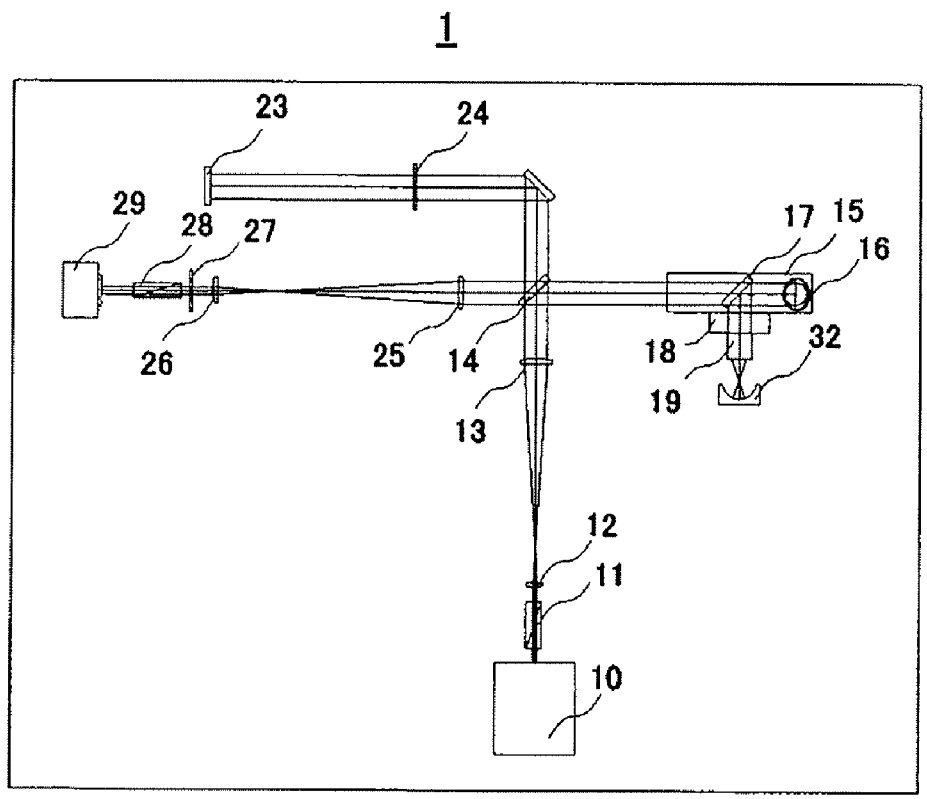
FIG. 3 is a schematic section view showing the structure of the measuring apparatus for measuring a polarization optical characteristic of the measuring optical system other than the test object.

Next, description will be made of separation of the polarization characteristic matrix of the test object OS from the polarization characteristic matrix of the measuring optical system (the optical elements) other than the test object OS. FIGS. 2 and 3 are schematic section views showing the structure of the measuring apparatus 1 for measuring the polarization optical characteristic of the measuring optical system other than the test object OS.

FIG. 2 shows the structure of the measuring apparatus 1 for measuring the polarization optical characteristic. In this case, the polarization optical characteristic is provided in the optical path of light which travels from the polarizer 11 and passes through the beam expanders 12 and 13, is reflected by the half mirror 14, and is returned by a reference plane mirror 30. Alternatively, it is provided in the optical path of light which is returned by the reference plane mirror 30 and transmitted through the half mirror 14, the pupil image-forming lenses 25 and 26. In the following, a system error 1 is defined as the structure of the optical path of light which travels from the polarizer 11 and passes though the beam expanders 12 and 13, is reflected by the half mirror 14, and returned by the reference plane mirror 30, and the Jones matrix of the system error 1 is referred to as Jsys1.

The reference plane mirror 30 for system measurement is disposed in the optical path of the collimated luminous flux after the transmission through the beam expanders 12 and 13. Raw glass, an aluminum mirror with no protective coating or the like is used as the reference plane mirror 30 to reduce the influence of the birefringence of the mirror. While the reference plane mirror 30 is disposed immediately after the half mirror 14 in Embodiment 1, it may be disposed anywhere in the optical path before the collimator lens 19. The Jones matrix in this state is calculated from three emergence polarization states for three incident polarization states determined from rotation of the polarizer 11, similarly to the abovementioned one.

Next, a polarizer 31 is disposed in the stage after the reference plane mirror 30. With the placement of the polarizer 31, the polarization state before the polarizer 31 is reset after the reflection by the reference plane mirror 30, so that the polarization optical characteristic can be measured in the optical path of light which is transmitted through the half mirror 14 and the pupil image-forming lenses 25 and 26. In the following, a system error 2 is defined as the structure of the optical path of light which is returned by the reference plane mirror 30 and is transmitted through the half mirror 14 and the pupil image-forming lenses 25 and 26, and the Jones matrix of the system error 2 is referred to as Jsys2.

The polarizer 31 is installed on a θ stage, not shown, similarly to the polarizer 11 for normal measurement, and is controlled to rotate about the optical axis by a controller, not shown. The Jones matrix Jsys2 is measured from the results of the polarization rotation of the incident light by the polarizer 31. The rotation of the polarizer 11 needs to be adjusted to provide a sufficient light amount after transmission through the polarizer 31. The polarizer 11 may be removed to ensure a sufficient light amount.

Referring to FIG. 3, a reference spherical mirror 32 is disposed with its center of curvature positioned at the focal point of the collimator lens 19. In the structure, the polarization optical characteristic is measured in the optical path of light which is reflected by the half mirror 14 and transmitted through the pupil image-forming lenses 25 and 26. In this case, the light from the light source 10 passes through the polarizer 11 and the beam expanders 12 and 13, is reflected by the half mirror 14, is reflected by the return mirror 16, the mirror 17, and the collimator lens 19 on the associated stages, and is then reflected back by those three elements along the same path, followed by incidence on the half mirror 14. In the following, a system error 3 is defined as the structure of the optical path of light which is reflected by the half mirror 14, reflected by the return mirror 16, the mirror 17, and the collimator lens 19 on the associated stages, then reflected back by those three elements along the same path, and transmitted through the half mirror 14 and the pupil image-forming lenses 25 and 26. The Jones matrix of the system error 3 is referred to as Jsys3. The Jones matrix Jsys3 is measured from the results of the polarization rotation of the incident light by the polarizer 11, similarly to the Jones matrix Jsys1.

The four Jones matrixes Jtest, Jsys1, Jsys2, and Jsys3 provided as described above are used to calculate the Jones matrix of the test object OS. Each of the respective Jones matrixes is represented as the following expression 3 by using the Jones matrix of each optical element (optical system) included:

$$Jtest = J_{HM(T)\text{-}QWP} \cdot J_{ColLens\text{-}HM(T)} \cdot J_{Lens} \cdot J_{Lens} \cdot J_{HM(R)\text{-}ColLens} \cdot J_{pol\text{-}HM(R)}$$

$$Jsys1 = J_{HM(T)\text{-}QWP} \cdot J_{pol\text{-}HM(R)}$$

$$Jsys2 = J_{HM(T)\text{-}QWP}$$

$$Jsys3 = J_{HM(T)\text{-}QWP} \cdot J_{ColLens\text{-}HM(T)} \cdot J_{HM(R)\text{-}ColLens} \cdot J_{pol\text{-}HM(R)}$$

(Expression 3)

Expression 3 includes no representation of the reference plane mirror 30 and the reference spherical mirror 32 since they have negligible influence upon the polarization. $J_{pol\text{-}M(R)}$ represents the Jones matrix in the optical path from the emergence from the polarizer 11 to the reflection by the half mirror 14. $J_{HM(R)\text{-}ColLens}$ represents the Jones matrix in the optical path from the reflection by the half mirror 14 to the transmission through the collimator lens 19. $J_{Lens}$ represents the Jones matrix of the test object OS, and $J_{ColLens\text{-}HM(T)}$ represents the Jones matrix in the optical path from the transmission through the collimator lens 19 to the incidence on the λ/4 plate 27.

The Jones matrix $J_{HM(R)\text{-}ColLens}$ in the optical path from the reflection by the half mirror 14 to the transmission through the collimator lens 19 is equal to the Jones matrix $J_{ColLens\text{-}HM(T)}$ in the optical path from the transmission through the collimator lens 19 to the incident on the λ/4 plate 27. Thus, the following expression 4 holds:

$$J_{HM(R)\text{-}ColLens} = (Jsys2^{-1} \cdot Jsys3 \cdot (Jsys2^{-1} \cdot Jsys1)^{-1})^{1/2}$$

(Expression 4)

The Jones matrix $J_{Lens}$ of the test object OS is represented as the following expression 5, and only the Jones matrix $J_{Lens}$ of the test object OS can be calculated.

$$J_{Lens} = (Jsys2^{-1} \cdot (Jsys2^{-1} \cdot Jsys3 \cdot (Jsys2^{-1} \cdot Jsys1)^{-1})^{-1/2} \cdot Jtest \cdot (Jsys2^{-1} \cdot Jsys3 \cdot (Jsys2^{-1} \cdot Jsys1)^{-1})^{-2} \cdot (Jsys2^{-1} \cdot Jsys1)^{-1})^{-1/2}$$

(Expression 5)

In this manner, the measuring apparatus 1 can measure the Jones matrix which is the polarization characteristic matrix of the test object OS. To derive the phase lag and the optical characteristic direction which are birefringence characteristics from the Jones matrix, an eigenvalue and an eigenvector of the Jones matrix $J_{Lens}$ of the test object OS may be determined to derive a phase lag from a phase difference between two sets of eigenvalues, and a characteristic axial angle from the angle of an eigenvector.

Next, description will be made of normalization of the Jones matrix using a predetermined (that is, a known) transmitted wavefront to calculate a wavefront in polarization distribution in the pupil plane of the test object OS. First, a transmitted wavefront $W_{in}(r, \theta)$ is measured in the pupil plane of the test object OS for predetermined incident polarization, where (r, θ) represents the coordinates on the pupil plane of the test object OS. Embodiment 1 takes an example in which linear polarization $E_{in} = (1,0)$ in an X direction is incident.

Next, a transmitted wavefront $P_{in}(r, \theta)$ in the pupil plane provided in interference measurement is calculated from the Jones matrix $J_{Lens}(r, \theta)$ in the pupil plane which is the polarization characteristic of the test object OS. When the polarization state $E_{in}$ is incident, luminous flux under test $E_{out}(r, \theta)$ is represented as the following expression 6 by using the Jones matrix in the pupil plane:

$$E_{out}(r, \theta) = J_{Lens}(r, \theta) E_{in} = \begin{pmatrix} J_{Lens}11(r, \theta) \\ J_{Lens}21(r, \theta) \end{pmatrix}$$

(Expression 6)

$$J_{Lens}(r, \theta) = \begin{pmatrix} J_{Lens}11(r, \theta) & J_{Lens}12(r, \theta) \\ J_{Lens}21(r, \theta) & J_{Lens}22(r, \theta) \end{pmatrix}$$

On the other hand, reference luminous flux in the incident state $E_{in}$ is perpendicularly reflected and returned. Thus, the transmitted wavefront $P_{in}(r, \theta)$ on the pupil plane provided in interference measurement for the incident polarization $E_{in}$ is represented as the following expression 7:

$$P_{in}(r, \theta) = \text{arg}(1 + \text{exp}(iI(r, \theta)))$$

(Expression 7)

Since the actually measured transmitted wavefront in the pupil plane of the test object OS is $W_{in}(r, \theta)$, the Jones matrix $J_{Lens}0$ provided by normalizing the transmitted wavefront $P_{in}(r, \theta)$ for the offset is represented as the following expression 8:

$$J_{Lens}0(r, \theta) = \exp(2\pi i\, W_{in}(r, \theta) - P_{in}(r, \theta))J_{Lens}(r, \theta) \quad \text{(Expression 8)}$$
$$= \exp(2\pi i\, W_{in}(r, \theta) - \arg(J_{Lens}11(r, \theta)))$$
$$J_{Lens}(r, \theta)$$

Thus, the wavefront in arbitrary polarization distribution can be calculated from the Jones matrix $J_{Lens}0$. Such calculation can be made for all the pixels in the pupil of the test object OS to calculate the phase lag and the characteristic axial angle which are birefringence characteristics of the test object OS and the wavefront in arbitrary polarization distribution.

Embodiment 2

Figure 4:
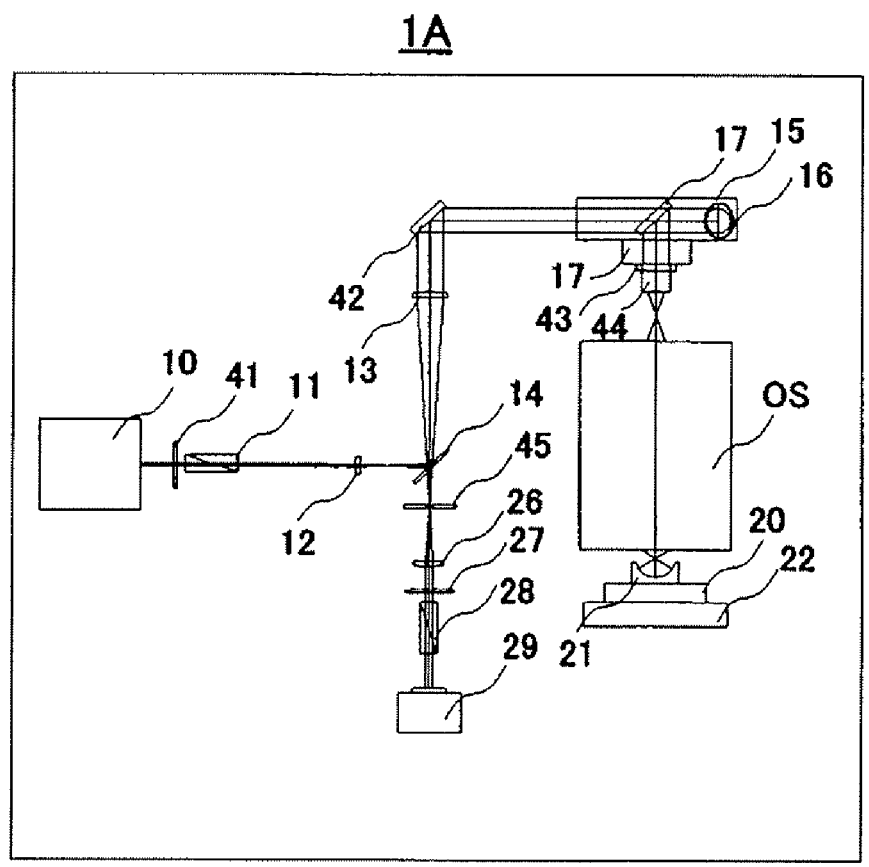
FIG. 4 is a schematic section view showing the structure of a measuring apparatus according to another aspect of the present invention.

FIG. 4 is a schematic section view showing the structure of a measuring apparatus 1A according to an aspect of the present invention. The measuring apparatus 1A of Embodiment 2 includes a Fizeau interferometer for measuring a wavefront (a transmitted wavefront) of light transmitted through a test object OS and measures birefringence of the test object OS. Since the measurement of the Jones matrix of the test object OS associated with the measurement of the polarization characteristic matrix is similar to that in Embodiment 1, description will be made only of separation of luminous flux under test from reference luminous flux performed in a different manner from that in Embodiment 1.

Referring to FIG. 4, luminous flux which emitted from a light source 10 is linearly polarized at an arbitrary angle by a λ/2 plate 41 and a polarizer 11. The luminous flux which emerged from the polarizer 11 is once condensed by a beam expander 12 and is reflected and diverged by a half mirror 14. The luminous flux which was reflected by the half mirror 14 is collimated by a beam expander 13 to have an increased beam diameter. The luminous flux which passed through the beam expander 13 is reflected by a mirror 42, enters an object-side XY stage 15, is reflected by an X stage return mirror 16 to a mirror on a Y stage, not shown, and is then reflected by a mirror 17 to an object-side Z stage 18.

A so-called TS lens 44 is disposed across a PZT actuator 43 from the object-side Z stage 18. The TS lens 44 has a radius of curvature of a final surface equal to the distance from the final surface to the focal point. The object-side Z stage 18 is driven such that the converging position of the luminous flux transmitted through the TS lens 44 (the focal point of the TS lens 44) is at the object surface of the test object OS. The object-side XY stage 15 is driven such that the converging position of the luminous flux transmitted through the TS lens 44 is at the object position where birefringence is measured.

The TS lens 44 has an antireflective coating film except on the final surface for the wavelength of light from the light source 10, and only the final surface is made of raw glass with no coating. Thus, approximately 5% of the incident light amount is reflected by the final surface of the TS lens 44 and returned to the half mirror 14 along the same optical path. The luminous flux reflected by the final surface of the TS lens 44 will hereinafter be referred to as reference luminous flux.

The luminous flux which passed through the TS lens 44 and entered the test object OS is transmitted through the test object OS and is formed into an image at an image point determined by the magnification of the test object OS. A spherical mirror 21 is disposed on an image-side Z stage 20.

In Embodiment 2, when birefringence of the test object OS is measured, the image-side Z stage 20 and an image-side XY stage 22 adjust the position such that the image-forming position (the image point) of the test object OS is shifted by Δ from the center of curvature of the spherical mirror 21 in the direction perpendicular to the optical axis of the measuring optical system (the test object OS). On the other hand, in measuring the transmitted wavefront, the spherical mirror 21 is disposed such that the image-forming position of the test object OS coincides with the center of curvature of the spherical mirror 21. The spherical mirror 21 is made of raw glass similarly to the final surface of the TS lens 44. The luminous flux reflected by the spherical mirror 21 will hereinafter be referred to as luminous flux under test.

The reference luminous flux which was reflected by the final surface of the TS lens 44 travels along the same optical path and is transmitted through the half mirror 14. On the other hand, the luminous flux under test which was reflected by the spherical mirror 21 travels and is incident on the half mirror 14 along the return path inclined with respect to the go path since the center of curvature of the spherical mirror 21 is shifted by Δ from the image-forming position. The shift amount Δspf between the luminous flux under test and the reference luminous flux on a spatial filter 45 disposed at the position conjugate to the focal point of the TS lens 44 is represented as the following expression 9:

$$\Delta spf = 2 \times \Delta/\beta Lens \times Fexp/Fts \quad \text{(Expression 9)}$$

where βLens represents the lateral magnification of the test object OS, Fts the focal length of the TS lens 44, and Fexp the focal length of the beam expander 13.

Figure 5:
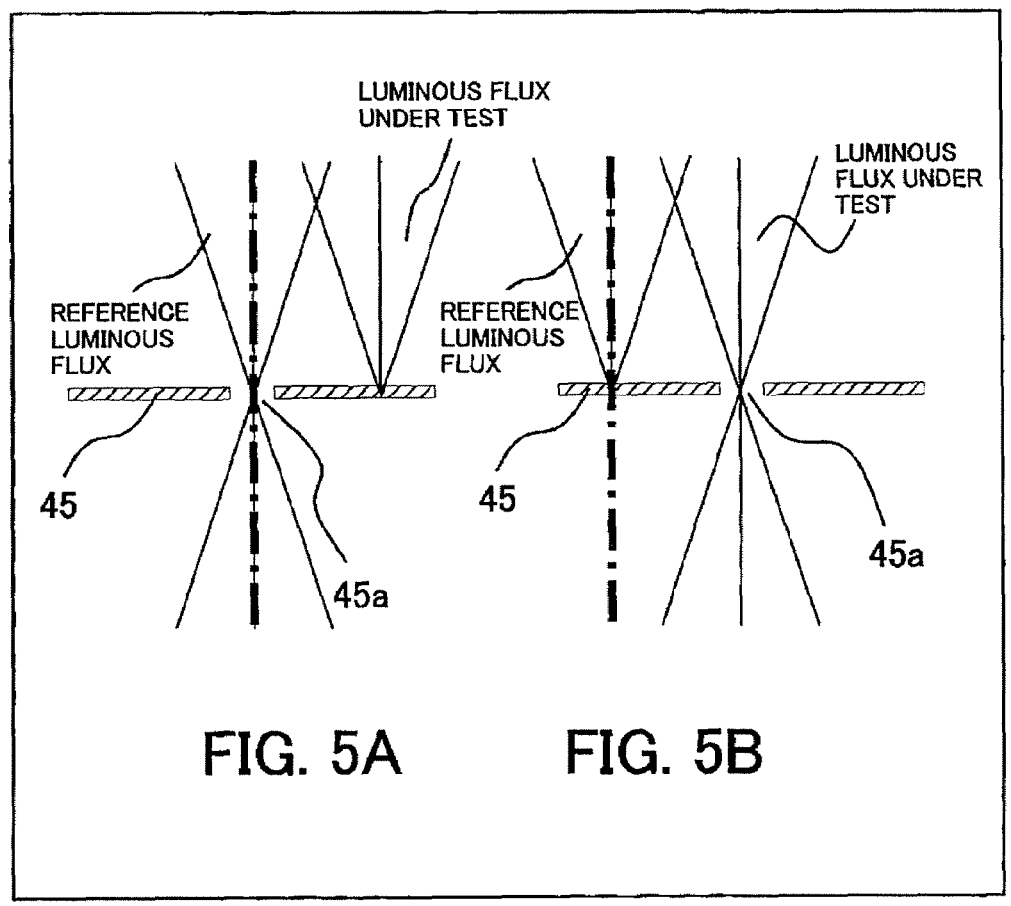
FIGS. 5(a) and 5(b) are enlarged section views showing a spatial filter shown in FIG. 4 and its surroundings.

The shift amount Δspf shown by expression 9 is used to separate the luminous flux under test from the reference luminous flux. FIGS. 5(a) and 5(b) are enlarged section views showing the spatial filter (aperture) 45 and its surroundings. The spatial filter is disposed at the position optically conjugate to the object surface and the image plane of the test object OS. In FIGS. 5(a) and 5(b), dashed lines show the optical axis of the measuring optical system. As shown in FIG. 5(a), the center of an opening 45a of the spatial filter 45 is on the optical axis of the measuring optical system in normal interferometer measurement. On the other hand, in measuring birefringence, as shown in FIG. 5(b), the spatial filter 45 is shifted by the amount Δspf to move the center of the opening 45a of the spatial filter 45 to the position where the luminous flux under test is converged, thereby blocking the reference luminous flux and transmitting only the luminous flux under test.

The luminous flux under test which passed through the spatial filter 45 is transmitted through a pupil image-forming lens 26 and collimated. The collimated luminous flux under test is subjected to polarization modulation by a λ/4 plate 27. Then, only the polarization component thereof in the transmission axis direction of a polarizer 28 is extracted by the polarizer 28, and taken as an image by a camera 29. The beam expander 13 and the pupil image-forming lens 26 cause the aperture of the TS lens 44 to be conjugate to the camera 29 and cause the aperture of the TS lens 44 to be conjugate to the pupil of the test object OS. Thus, the camera 29 is conjugate to the pupil of the test object OS.

The measuring apparatus 1A described above is used to measure emergence polarization for a plurality of incident polarization states provided by the polarizer 11 to derive the Jones matrix which is a polarization characteristic matrix of the luminous flux under test, similarly to Embodiment 1. Then, the Jones matrix resulting from the measuring optical system other than the test object OS can be removed to measure the polarization characteristic matrix in the pupil plane of the test object OS.

Embodiment 3

Embodiment 3 will be described in conjunction with a method of averaging interference patterns by using fringe scan, separating luminous flux under test from reference luminous flux, and measuring a polarization characteristic matrix of a test object OS. Embodiment 1 employs the light shield plate 24 to block the reference luminous flux and Embodiment 2 employs the spatial filter 45 to block the reference luminous flux, thereby detecting only the luminous flux under test. In Embodiment 3, however, reference luminous flux is not blocked, and only the information about luminous flux under test is taken out by accumulating the intensity of interference patterns. Description will hereinafter be made mainly of the structure and operation different from those in Embodiment 2.

In Embodiment 3, in the structure of the measuring apparatus 1A shown in FIG. 4, the image-side Z stage 20 and the image-side XY stage 22 are adjusted such that the center of curvature of the spherical mirror 21 coincides with the image-forming point of the test object OS in measuring birefringence of the test object OS. The center of the opening 45a of the spatial filter 45 is disposed on the optical axis of the measuring optical system. With the arrangement, the camera 29 takes images of interference patterns from the interference between the luminous flux under test and the reference luminous flux in accordance with the difference in optical path length between the luminous flux under test and the reference luminous flux and the wavefront aberration of the test object OS.

In measuring the polarization of luminous flux incident on the λ/4 plate 27, the PZT actuator 43 displaced on the object-side Z stage 17 is linearly driven by an integral multiple of one-half wavelength for each of small angle steps of the λ/4 plate 27, and the accumulated light amount during that period is used to calculate the information about the luminous flux under test.

Figure 6:
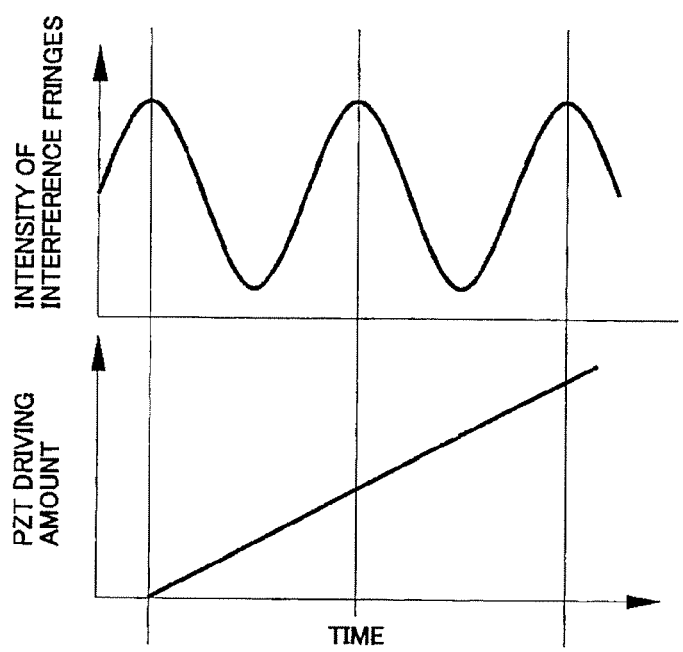
FIGS. 6(a) and 6(b) are graphs showing the driving of a PZT actuator shown in FIG. 4 and variations in interference patterns in a pixel of a camera.

FIGS. 6(*a*) and 6(*b*) are graphs showing the driving of the PZT actuator 43 and variations in interference patterns in a pixel of the camera 29. Each time the driving amount of the PZT actuator 43 shown in FIG. 6(*b*) reaches an integral multiple of one-half wavelength, the intensity of interference patterns shown in FIG. 6(*a*) periodically varies. The intensity Ifrg of interference patterns is represented as the following expression 10:

$$Ifrg = Itest + Iref + 2V\sqrt{Itest \cdot Iref}\cos(2\pi L/\lambda) \quad \text{(Expression 10)}$$

where Iref represents the light amount of the luminous flux under test, Itest the light amount of the reference luminous flux, V the contrast between the interference patterns of the luminous flux under test and the reference luminous flux, and L the difference in the optical path length between the luminous flux under test and the reference luminous flux.

Thus, the accumulated light amount provided when the optical path length difference is changed by the integral multiple of the wavelength is equal to the sum of the amount of the luminous flux under test and the amount of the reference luminous flux, and the interference components are canceled out.

In Embodiment 3, the PZT actuator 43 is driven to perform scanning for the interference patterns. When the wavelength of the light source 10 can be changed, the scanning for interference patterns may be performed by changing the wavelength. In such a case, the wavelength change represented by the following expression 11 can be used to determine variations in interference patterns for one cycle:

$$d\lambda = \lambda^2/L \quad \text{(Expression 11)}$$

With the abovementioned measurement, the DC component, the second harmonic component, and the fourth harmonic component provided when the λ/4 plate 27 is rotated are calculated as the sum of the reference luminous flux and the luminous flux under test. Only the components of the luminous flux under test modulated by the λ/4 plate 27 can be calculated with the following expression 12:

$$DCtest = DCref+test - DCref$$

$$SHtest = SHref+test - SHref$$

$$FHtest = FHref+test - FHref \quad \text{(Expression 12)}$$

where DCref+test represents the DC component, SHref+test the second harmonic component, and FHref+test the fourth harmonic component.

Next, the emergence polarization state is calculated from these modulated components, and the emergence polarization of the luminous flux under test is measured for a plurality of incident polarization states provided by the polarizer 11 to determine the Jones matrix which is the polarization characteristic matrix of the luminous flux under test. Then, the Jones matrix resulting from the measuring optical system other than the test object OS can be removed to determine the polarization characteristic matrix in the pupil plane of the test object OS.

Embodiment 4

Embodiment 4 will be described in conjunction with a method of measuring transmittance distribution in the pupil plane of the test object OS by using a measuring apparatus having the same structure as that of Embodiment 1. In the measurement of the measuring apparatus 1 shown in FIGS. 1A and 3, the Jones matrixes represented by the following expression 13 are measured from the system errors 1 and 2:

$$Jtest = J_{HM(T)\text{-}QWP} \cdot J_{ColLens\text{-}HM(T)} \cdot J_{Lens} \cdot J_{Lens} \cdot J_{HM(R)\text{-}ColLens} \cdot J_{pol\text{-}HM(R)}$$

$$Jsys3 = J_{HM(T)\text{-}QWP} \cdot J_{ColLens\text{-}HM(T)} \cdot J_{HM(R)\text{-}ColLens} \cdot J_{pol\text{-}HM(R)} \quad \text{(Expression 13)}$$

As described in Embodiment 1, since the Jones matrix calculated from the measurement of the normal polarization characteristic matrix is normalized for the elements of two rows and two columns, these are normalized for the transmittance for entering unpolarized luminous flux in this case. The transmittance Tup for the unpolarized luminous flux is represented by the following expression 14 with each element of the Jones matrix J:

$$Tup = \frac{1}{2}\sum_{i,j}|J_{ij}|^2 \quad \text{(Expression 14)}$$

Thus, the transmittance may be calculated from the Jones matrix determined in Embodiment 1, and each element may be divided by $\sqrt{2Tup}$. The following expression 15 holds:

$$T_{test}j_{test} = T_{HM(T)\text{-}QWP}T_{Lens}^2 T_{HM(R)\text{-}ColLens}^2 \cdot T_{pol\text{-}HM(R)}j_{HM(T)\text{-}QWP}j_{ColLens\text{-}HM(T)}j_{Lens}\cdot j_{HM(R)\text{-}ColLens}\cdot j_{pol\text{-}HM(R)}$$

$$T_{sys3} j_{sys3} = T_{HM(T)-QWP} T_{HM(R)-ColLens}^2$$
$$T_{pol-HM(R)} j_{HM(T)-QWP} \cdot j_{ColLens-HM(T)} \cdot$$
$$j_{HM(R)-ColLens} j_{pol-HM(R)}$$

(Expression 15)

where j represents the Jones matrix normalized for the unpolarized luminous flux and T represents the actual transmittance of the optical element represented by each Jones matrix for unpolarized luminous flux.

In addition, the following expression 16 holds:

$$I_{test}(\chi_{test}) = T_{test}^2 \left| j_{test} \cdot \begin{bmatrix} 1 \\ \chi_{test} \end{bmatrix} \right|^2$$

(Expression 16)

$$I_{sys3}(\chi_{sys3}) = T_{sys3}^2 \left| j_{sys3} \cdot \begin{bmatrix} 1 \\ \chi_{sys3} \end{bmatrix} \right|^2$$

where Itest and Isys3 represent the actual light amounts detected by the camera 29 in the entering polarization Xtest and Xsys3 in measuring the Jones matrixes Jtest and Jsys3.

Thus, the transmittance $T_{lens}$ of the test object OS for the unpolarized luminous flux may be calculated from the following expression 17:

$$T_{lens} = \sqrt{\frac{I_{test}(\chi_{test}) |j_{HM(T)-QWP} \cdot j_{ColLens-HM(T)} \cdot j_{HM(R)-ColLens} \cdot j_{pol-HM(R)}|^2}{I_{sys3}(\chi_{sys3}) |j_{HM(T)-QWP} \cdot j_{ColLens-HM(T)} \cdot j_{Lens} \cdot j_{Lens} \cdot j_{HM(R)-ColLens} \cdot j_{pol-HM(R)}|^2}}$$

(Expression 17)

The transmittance for arbitrary polarization may be calculated from the following expression 18:

$$Tlens(\chi_{in}) = Tlens \frac{|j_{lens11} + j_{lens12} \chi_{in}|^2 + |j_{lens21} + j_{lens22} \chi_{in}|^2}{1 + |\chi_{in}|^2}$$

(Expression 18)

where Xin represents the incident polarization parameter.

Embodiment 5

While Embodiments 1 to 4 include the interferometer having the additional function of measuring the birefringence (the polarization characteristic matrix), the function of the interferometer may not be provided. In such a case, the influence of the birefringence of the optical system other than the test object OS can be removed as described above to measure the polarization characteristic matrix in the same state as that of the interferometer shown in Embodiments 1 to 4.

Figure 7:
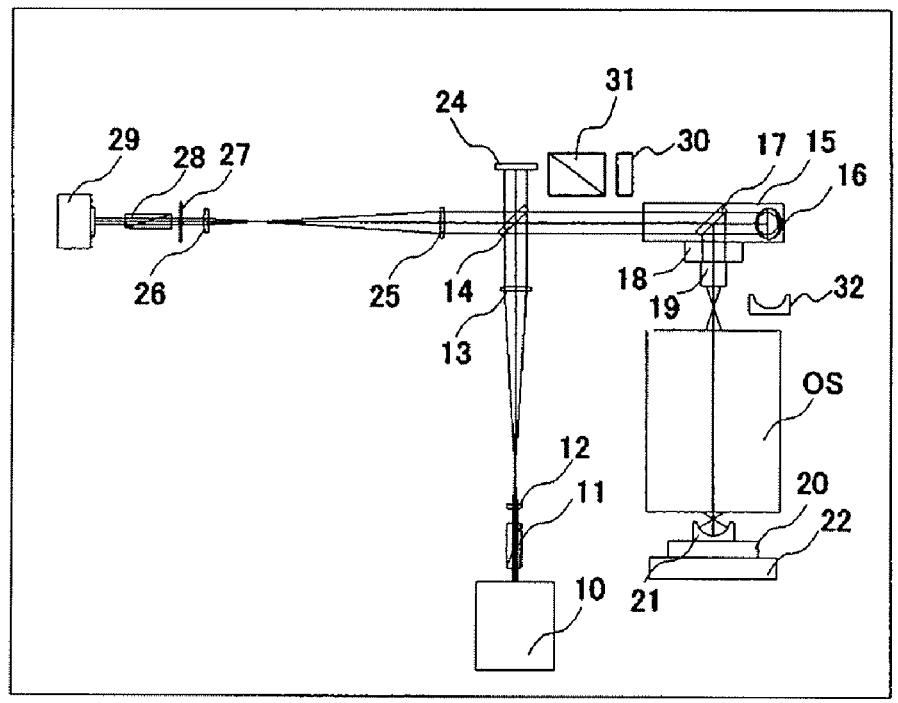
FIG. 7 is a schematic section view showing the structure of a measuring apparatus according to another aspect of the present invention.

FIG. 7 shows a schematic section view showing the structure of a measuring apparatus 1B according to an aspect of the present invention. The measuring apparatus 1B has only the function of measuring a polarization characteristic matrix of a test object OS.

Referring to FIG. 7, luminous flux which emitted from a light source 10 is transmitted through a polarizer 11 to have a predetermined (that is, a known) polarization state. The luminous flux emitting from the light source 10 is circularly polarized. Simply rotating the polarizer 11 can provide a sufficient amount of arbitrarily linearly polarized light. The polarizer 11 is disposed to be driven on a θ stage, not shown, and controlled by a controller, not shown.

The luminous flux which passed through the polarizer 11 is linearly polarized depending on the angle of the polarizer 11. The luminous flux which passed through the polarizer 11 is transmitted through beam expanders 12 and 13 for increasing the beam diameter and is incident on a half mirror 14 as collimated luminous flux. Embodiment 4 does not have the function of an interferometer, so that the measuring apparatus 1B has no reference mirror. Thus, the luminous flux which passed through the half mirror 14 is blocked by a light shield plate 24. The luminous flux reflected by the half mirror 14 will hereinafter be referred to as luminous flux under test.

The luminous flux under test enters an object-side XY stage 15 and is reflected by an X stage return mirror 16 to a mirror on a Y stage, not shown, and is then reflected by a mirror 17 to an object-side Z stage 18. The return by the mirror is performed for the purpose of providing the same optical axis with respect to the stage even when the stage is moved, so that the luminous flux may be incident on the mirrors in a different order from that in Embodiment 5. A collimator lens 19 is disposed on the object-side Z stage 18. The object-side Z stage 18 is driven such that the focal point of the collimator lens 19 is at the object surface of the test object OS. The object-side XY stage 15 is driven to the object position where birefringence is measured.

The luminous flux under test which passed through the collimator lens 19 and entered the test object OS passes through the test object OS and is formed into an image at an image point which is determined by the magnification of the test object OS. A spherical mirror 21 is disposed on an image-side Z stage 20. The image-side Z stage 20 and an image-side XY stage 22 adjust the position such that the center of curvature of the spherical mirror 21 coincides with the image-forming position (the image point) of the test object OS.

The luminous flux under test which was reflected by the spherical mirror 21 passes through the test object OS and is returned to the half mirror 14 along the same optical path. The luminous flux under test which passed through the half mirror 14 is transmitted through pupil image-forming lenses 25 and 26 for providing a conjugate relationship between the pupil of the test object OS and a camera 29, and becomes collimated again. The collimated luminous flux under test is subjected to polarization modulation by λ/4 plate 27 disposed on a θ stage, not shown. Only the linearly polarized component specified by the angle of an analyzer 28 is transmitted through the analyzer 28 and is taken as an image by the camera 29. The θ stage, not shown, is controlled by a controller, not shown. The angle of the fast axis of the λ/4 plate 27 at the origin point of the θ stage and the angle of the transmission axis of the analyzer 28 are adjusted in parallel with the sheet (FIG. 7), similarly to the transmission axis of the analyzer 28.

A reference plane mirror 30, a polarizer 31, and a reference spherical mirror 32 can be inserted into and removed from the optical path of the luminous flux under test, as in the measuring apparatus 1.

With the measuring apparatus 1B described above, emergence polarization is measured for a plurality of incident polarization states provided by the polarizer 11 to determine the Jones matrix which is the polarization characteristic matrix of the luminous flux under test, similarly to Embodiment 1. Then, the Jones matrix resulting from the measuring optical system other than the test object OS can be removed to measure the polarization characteristic matrix in the pupil plane of the test object OS.

As described above, according to the measuring apparatus of the present invention, errors caused by the system are accurately corrected without considering the state of the test object (such as the direction of the fast axis of the test object)

although the interferometer is used. This allows precise measurement of the polarization characteristic matrix which is the polarization characteristic in the pupil plane of the test object. The birefringence distribution and the transmittance distribution in the pupil plane of the test object can also be measured accurately from the measured polarization characteristic matrix. In addition, the polarization characteristic matrix can be measured in the same state as that in measurement with the interferometer, so that the wavefront in the pupil plane of the test object in arbitrary polarization distribution can be measured precisely.

While the preferred embodiments of the present invention have been described, it goes without saying that the present invention is not limited to the abovementioned embodiments, and various modifications and variations may be made without departing from the spirit and scope thereof. For example, it is obvious that a catadioptric system formed of a lens and a mirror or a reflective system formed of a mirror may be used as the test object OS in each of Embodiments 1 to 5 in addition to the refractive optical system formed only of the lenses. In addition, the interferometer of Embodiments 1 to 5 may be installed on an exposure apparatus. (see U.S. Pat. No. 6,614,535B1)

This application claims a foreign priority benefit based on Japanese Patent Application No. 2005-027498 filed on Feb. 3, 2005, which is hereby incorporated by reference herein in its entirety as if fully set forth herein.

What is claimed is:

1. A measuring apparatus configured to measure a polarization characteristic and a transmission wavefront of a test object, the measuring apparatus comprising: a beam splitter configured to split light from a light source into reference light and light under test; a light shielding member; and a spherical mirror which reflects the light under test which has passed the test object and directs the light under test again to the test object; and a detector configured to detect the light under test, wherein said detector also detects the reference light when said light shielding member does not shield the reference light, wherein the transmission wavefront of the test object is measured when the detector detects an interference pattern formed by interference between the light under test and the reference light, wherein a polarization characteristic matrix in a pupil plane of the test object is measured when a light shielding member shields the reference light and the detector detects only the light under test: wherein the light shielding member includes a spatial filter which is disposed on a plane where the reference light is converged, and wherein the reference light is blocked by the spatial filter when the spherical mirror and the spatial filter are moved.

2. The measuring apparatus according to claim 1, further comprising:
   a wavelength plate configured to provide a predetermined phase lag to the light under test; and
   a polarizer configured to extract only a linearly polarized light component in an arbitrary direction from the light under test that has passed through the wavelength plate.

3. The measuring apparatus according to claim 2, wherein the wavelength plate is a $\lambda/4$ plate.

4. The measuring apparatus according to claim 2, wherein the polarizer is a Rochon prism.

5. The measuring apparatus according to claim 1, further comprising a normal-incidence reflective mirror which can be inserted into and removed from an optical path of the light under test.

6. The measuring apparatus according to claim 1, wherein the polarization characteristic matrix is the Jones matrix.

* * * * *